(12) United States Patent
Zhang et al.

(10) Patent No.: US 12,164,345 B2
(45) Date of Patent: Dec. 10, 2024

(54) ROTATING MECHANISM, SUPPORT APPARATUS, AND ELECTRONIC DEVICE

(71) Applicant: Honor Device Co., Ltd., Shenzhen (CN)

(72) Inventors: Yaolei Zhang, Shenzhen (CN); Longlong Gong, Shenzhen (CN); Mingqian Gao, Shenzhen (CN); Yuan Wang, Shenzhen (CN); Haifei Li, Shenzhen (CN); Leibo Yuan, Shenzhen (CN); Bin Yan, Shenzhen (CN); Guotong Zhou, Shenzhen (CN); Kuibing Zhao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/923,726

(22) PCT Filed: Apr. 26, 2022

(86) PCT No.: PCT/CN2022/089417
§ 371 (c)(1),
(2) Date: Nov. 7, 2022

(87) PCT Pub. No.: WO2022/247567
PCT Pub. Date: Dec. 1, 2022

(65) Prior Publication Data
US 2024/0219973 A1    Jul. 4, 2024

(30) Foreign Application Priority Data
May 27, 2021 (CN) .......................... 202110586712.6

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC ............................ G06F 1/1652; G06F 1/1681
See application file for complete search history.

(56) References Cited

U.S. PATENT DOCUMENTS

| 9,348,450 B1* | 5/2016 | Kim ..................... H04M 1/0268 |
| 11,615,722 B2* | 3/2023 | Morino ................. G06F 1/1616 345/173 |

(Continued)

FOREIGN PATENT DOCUMENTS

| CN | 106205385 A | 12/2016 |
| CN | 205812097 U | 12/2016 |

(Continued)

*Primary Examiner* — Sagar Shrestha
(74) *Attorney, Agent, or Firm* — Leydig, Voit & Mayer, Ltd.

(57) ABSTRACT

This disclosure relates to the technical field of electronic devices and provides a rotating mechanism, a support apparatus, and an electronic device. The rotating mechanism includes a base, a first door panel, a first connector, and a first main swing arm. The first door panel is hinged to the base, the first connector is hinged to the first door panel, and the first connector is configured to connect a first housing. One end of the first main swing arm is hinged to the base, and the other end of the first swing arm is hinged to the first connector. When the rotating mechanism rotates between an unfolded state and a folded state, a rotation angle of the first main swing arm relative to the base is smaller than a rotation angle of the first door panel relative to the base.

17 Claims, 14 Drawing Sheets

(56) References Cited

U.S. PATENT DOCUMENTS

| | | | | |
|---|---|---|---|---|
| 11,653,520 | B2* | 5/2023 | Sim | H04M 1/022 |
| | | | | 361/679.01 |
| 11,792,946 | B2* | 10/2023 | Park | H05K 5/0017 |
| | | | | 361/679.01 |
| 11,933,351 | B2* | 3/2024 | Jiang | F16C 11/04 |
| 2015/0233162 | A1* | 8/2015 | Lee | H04M 1/022 |
| | | | | 16/223 |
| 2016/0085265 | A1* | 3/2016 | Park | H04M 1/0268 |
| | | | | 361/807 |
| 2019/0208649 | A1* | 7/2019 | Jeon | G06F 1/1652 |
| 2021/0357000 | A1 | 11/2021 | Deng | |
| 2022/0113769 | A1* | 4/2022 | Kinoshita | E05D 11/082 |
| 2022/0232729 | A1* | 7/2022 | Ohyama | H05K 5/0017 |
| 2022/0338362 | A1* | 10/2022 | Morino | H05K 5/0226 |
| 2023/0305602 | A1* | 9/2023 | Miyamoto | G06F 1/1681 |
| 2024/0211004 | A1* | 6/2024 | Kinoshita | G06F 1/1681 |

FOREIGN PATENT DOCUMENTS

| | | |
|---|---|---|
| CN | 109780403 A | 5/2019 |
| CN | 111614806 A | 9/2020 |
| CN | 211423150 U | 9/2020 |

\* cited by examiner

ROTATING MECHANISM, SUPPORT APPARATUS, AND ELECTRONIC DEVICE

CROSS-REFERENCE TO RELATED APPLICATIONS

This application is a national stage of International Application No. PCT/CN2022/089417, filed on Apr. 26, 2022, which claims priority to Chinese Patent Application No. 202110586712.6, filed on May 27, 2021. Both of the aforementioned applications are hereby incorporated by reference in their entireties.

TECHNICAL FIELD

This application relates to the technical field of electronic devices, and in particular, to a rotating mechanism, a support apparatus, and an electronic device.

BACKGROUND

With the development of technologies of foldable screens, an electronic device with a foldable screen has become a hotspot technology. Existing folding manners include inward folding and outward folding, that is, a screen is disposed inside or outside after being folded. A problem with outward folding is that the screen is exposed, and may be easily scratched by a hard object.

In an existing foldable screen, a base of a rotating mechanism configured to support a bent part of the foldable screen is often relatively wide, so that an electronic device has a relatively large thickness in a folded state, which is not conducive to a thin design of the electronic device in the folded state. The base has a relatively large width, so that the bent part of the foldable screen has a relatively large width, which is not conducive to a compact design of the structure of the electronic device.

SUMMARY

Embodiments of this application provide a rotating mechanism, a support apparatus, and an electronic device, so that a width of a base of the rotating mechanism can be reduced, a thickness of the electronic device in a folded state is reduced, and the structure of the electronic device is more compact.

To achieve the foregoing objective, the following technical solutions are used in the embodiments of this application:

According to a first aspect, some embodiments of this application provide a rotating mechanism, where the rotating mechanism includes a base, a first door panel, a first connector, and a first main swing arm. The first door panel is hinged to the base, the first connector is hinged to the first door panel, and the first connector is configured to be fixed to a first housing. The base is further configured to be connected to a second housing. The first door panel, the first housing, and the second housing each have a lamination surface, and the lamination surface is used for lamination to a foldable screen. The first main swing arm is located on a side of the first door panel away from the lamination surface of the first door panel, one end of the first main swing arm is hinged to the base, and the other end of the first swing arm is hinged to the first connector. The rotating mechanism can rotate between an unfolded state and a folded state. When the rotating mechanism is in the unfolded state, the lamination surface of the first door panel and the lamination surface of the first housing are coplanarly disposed and face a same direction. When the rotating mechanism is in the folded state, the lamination surface of the first housing faces the lamination surface of the second housing. When the rotating mechanism rotates between the unfolded state and the folded state, a rotation angle of the first main swing arm relative to the base is smaller than a rotation angle of the first door panel relative to the base.

In the rotating mechanism according to the embodiments of this application, in addition to being connected to the base by using the first door panel, the first connector is further connected to the base by using the first main swing arm. Therefore, structural strength of a hinge shaft between the first door panel and the base no longer plays a decisive role in connection stability between the first housing and the second housing. A diameter of the hinge shaft may be designed to be relatively small, provided that a hinging function is met, and connection strength may be ensured mainly by using a hinge part between the first main swing arm and the base. On this basis, when the rotating shaft mechanism rotates between the unfolded state and the folded state, the rotation angle of the first main swing arm relative to the base is smaller than the rotation angle of the first door panel relative to the base, so that a central angle of the arc-shaped rib configured to hinge the first main swing arm to the base may be designed to be relatively small, and a length of the arc-shaped rib may be designed to be relatively small, thereby reducing the width of the base and a thickness of an electronic device in the folded state. When the electronic device is in the unfolded state, a width of the third part supported on the rotating mechanism is relatively small, which is conducive to a compact design of the structure of the electronic device.

In a possible implementation of the first aspect, when the rotating mechanism is in the folded state, an included angle between the lamination surface of the first housing and the lamination surface of the first door panel on a side for lamination to the foldable screen is greater than 180°, and an inclination angle of the lamination surface of the first door panel on the side for lamination to the foldable screen relative to the base is less than 90°. In this way, the bent part of the foldable screen may be folded into a water drop shape.

In a possible implementation of the first aspect, the first door panel includes a door panel body and a slide rail. One end of the slide rail is hinged to the base, the door panel body is slidably connected to the slide rail, the first connector is hinged to the door panel body, and the lamination surface of the first door panel is located on the door panel body. The rotating mechanism further includes a first control assembly, and the first control assembly is configured to control the door panel body to slide away from the base along the slide rail when the rotating mechanism rotates from the unfolded state to the folded state. Therefore, the base is driven to sink, so as to avoid the bent part of the foldable screen and ensure that the bent part has a relatively large inward folding angle. The first control assembly is further configured to control the door panel body to slide close to the base along the slide rail when the rotating mechanism rotates from the folded state to the unfolded state. Therefore, the base is lifted, and the base is enabled to support the foldable screen when the rotating mechanism is in the unfolded state, so as to ensure flatness of the foldable screen.

In a possible implementation of the first aspect, the first control assembly is a hinged four-bar mechanism.

In a possible implementation of the first aspect, the first control assembly includes an auxiliary swing arm. The first connector is provided with a first sliding slot, and the first main swing arm is provided with a second sliding slot. One end of the auxiliary swing arm is hinged to the base, the other end of the auxiliary swing arm is provided with a sliding member, and the sliding member is slidably connected inside the first sliding slot and the second sliding slot. The structure is simple and has a relatively small thickness, which is conducive to the thin design of the electronic device.

In a possible implementation of the first aspect, two ends of the first sliding slot are a first end and a second end respectively, and the first sliding slot extends from the first end to the second end in a direction close to the base. Two ends of the second sliding slot are a third end and a fourth end respectively, and the second sliding slot extends from the third end to the fourth end in a direction close to the base.

In a possible implementation of the first aspect, the first sliding slot and the second sliding slot are each an arc-shaped sliding slot, and the first sliding slot and the second sliding slot are arched in a direction away from the lamination surface of the first door panel. In this way, driving stability is higher, and motion stability is higher.

In a possible implementation of the first aspect, the first sliding slot and the second sliding slot each have a length range of [4.5 mm, 5.5 mm] along an extension path thereof.

In a possible implementation of the first aspect, the first sliding slot and the second sliding slot each have a curvature radius range of [4.5 mm, 5.5 mm] at each position on the extension path thereof.

In a possible implementation of the first aspect, a part at which the first door panel is hinged to the base, a part at which the first main swing arm is hinged to the base, and a part at which the auxiliary swing arm is hinged to the base are staggered in a direction of a rotation axis of the rotating mechanism. In this way, a thickness of the base may be reduced to implement the thin design of the electronic device in an unfolded state.

In a possible implementation of the first aspect, a part at which the first door panel is hinged to the first connector and a part at which the first main swing arm is hinged to the first connector are staggered in a direction of a rotation axis of the rotating mechanism. In this way, a thickness of the first connector may be reduced to implement the thin design of the electronic device in the unfolded state.

In a possible implementation of the first aspect, the first connector is provided with a first hinge slot, and an inner wall of the first hinge slot is provided with a first arc-shaped rib. The first door panel is provided with a first hinge block, and the first hinge block is provided with a first arc-shaped elongated slot. The first hinge block is matched and accommodated in the first hinge slot, and the first arc-shaped rib is matched and accommodated in the first arc-shaped elongated slot. Therefore, hinging between the first connector and the first door panel is implemented. The structure is simple, which is conducive to reducing the thicknesses of the first connector and the first door panel.

In a possible implementation of the first aspect, the base is provided with a second hinge slot, and an inner wall of the second hinge slot is provided with a second arc-shaped rib. The first main swing arm is provided with a second hinge block, and the second hinge block is provided with a second arc-shaped elongated slot. The second hinge block is matched and accommodated in the second hinge slot, and the second arc-shaped rib is matched and accommodated in the second arc-shaped elongated slot. Therefore, hinging between the first main swing arm and the base is implemented. The structure is simple, which is conducive to reducing the thicknesses of the first main swing arm and the base.

In a possible implementation of the first aspect, the first connector is provided with a third hinge slot, and an inner wall of the third hinge slot is provided with a third arc-shaped rib. The first main swing arm is provided with a third hinge block, and the third hinge block is provided with a third arc-shaped elongated slot. The third hinge block is matched and accommodated in the third hinge slot, and the third arc-shaped rib is matched and accommodated in the third arc-shaped elongated slot. Therefore, hinging between the first main swing arm and the first connector is implemented. The structure is simple, which is conducive to reducing the thicknesses of the first main swing arm and the first connector.

In a possible implementation of the first aspect, a third door panel is fixed to the first main swing arm, the third door panel has a lamination surface, the lamination surface is used for lamination to the foldable screen, and the base is provided with an avoidance slot. When the rotating mechanism is in the unfolded state, the lamination surface of the third door panel, the lamination surface of the first door panel, and the lamination surface of the first housing are coplanarly disposed and face a same direction; and when the rotating mechanism is in the folded state, the third door panel rotates into the avoidance slot. Therefore, a lamination area between the rotating mechanism and the foldable screen may be increased, and support stability of the foldable screen is improved.

In a possible implementation of the first aspect, the base is provided with a foldable-screen avoidance slot, the foldable-screen avoidance slot is configured to avoid the bent part of the foldable screen when the foldable screen is in the folded state, so as to further increase the inward folding angle of the foldable screen and prolong the service life of the foldable screen.

In a possible implementation of the first aspect, the rotating mechanism further includes a second door panel, a second connector, and a second main swing arm. The second door panel is hinged to the base, the second connector is hinged to the second door panel, and the second connector is configured to be fixed to a second housing. The second door panel and the second housing each have a lamination surface, and the lamination surface is used for lamination to the foldable screen. The second main swing arm is located on a side of the second door panel away from the lamination surface of the second door panel, one end of the second main swing arm is hinged to the base, and the other end of the second swing arm is hinged to the second connector. When the rotating mechanism is in the unfolded state, the lamination surface of the second door panel and the lamination surface of the second housing are coplanarly disposed with the lamination surface of the first housing and the lamination surface of the first door panel and face a same direction. When the rotating mechanism rotates between an unfolded state and a folded state, a rotation angle of the second main swing arm relative to the base is smaller than a rotation angle of the second door panel relative to the base.

In the foregoing technical solution, in addition to being connected to the base by using the second door panel, the second connector is further connected to the base by using the second main swing arm. Therefore, structural strength of a hinge shaft between the second door panel and the base no longer plays a decisive role in connection stability between the first housing and the second housing. A diameter of the hinge shaft may be designed to be relatively small, provided that a hinging function is met, and connection strength may be ensured mainly by using a hinge part between the second main swing arm and the base. On this basis, when the rotating shaft mechanism rotates between the unfolded state and the folded state, the rotation angle of the second main swing arm relative to the base is smaller than the rotation angle of the second door panel relative to the base, so that a central angle of the arc-shaped rib configured to hinge the second main swing arm to the base may be designed to be relatively small, and a length of the arc-shaped rib may be designed to be relatively small, thereby further reducing the width of the base and a thickness of an electronic device in a folded state. When the electronic device is in the unfolded state, a width of the bent part supported on the rotating mechanism is relatively small, which is conducive to a compact design of the structure of the electronic device.

According to a second aspect, some embodiments of this application provide a support apparatus. The support apparatus includes a first housing, a second housing, and the rotating mechanism according to any one of the foregoing technical solutions, where the rotating mechanism is located between the first housing and the second housing, a first connector of the rotating mechanism is fixed to the first housing, and the base of the rotating mechanism is further connected to the second housing.

Because the support apparatus according to the embodiments of this application includes the rotating mechanism according to any one of the foregoing technical solutions, the support apparatus and the rotating mechanism can resolve a same technical problem and achieve a same effect.

According to a third aspect, some embodiments of this application provide an electronic device. The electronic device includes a foldable screen and the support apparatus according to the foregoing technical solutions. The foldable screen includes a first part, a second part, and a bent part, where the bent part is located between the first part and the second part, the first part is supported and fixed to a first housing, the second part is supported and fixed to a second housing, and the bent part is supported on a rotating mechanism of the support apparatus.

Because the electronic device according to the embodiments of this application includes the support apparatus according to the foregoing technical solutions, the support apparatus and the rotating mechanism can resolve a same technical problem and achieve a same effect.

BRIEF DESCRIPTION OF DRAWINGS

FIG. 7(*b*) is a schematic diagram of a structure when the rotating mechanism in the folded state;

FIG. 12(*b*) is a schematic diagram of a structure when the rotating mechanism in the folded state;

DESCRIPTION OF EMBODIMENTS

In embodiments of this application, the terms "first", "second", and "third" are used for descriptive purposes only, and cannot be construed as indicating or implying relative importance or implicitly indicating the quantity of technical features indicated. Therefore, the features defined with "first", "second" and "third" may explicitly or implicitly include one or more of the features.

In the embodiments of this application, the term "including", "containing" or any other variant thereof is intended to cover non-exclusive inclusion, so that a process, method, article or apparatus including a series of elements includes not only those elements, but also other elements not explicitly listed, or elements inherent to such a process, method, article or apparatus. Without further limitation, the element defined by the sentence "including a . . . " does not exclude that other identical elements are also present in the process, method, article or apparatus including the element.

This application provides an electronic device. The electronic device is an electronic device with a foldable screen. Specifically, the electronic device 100 includes, but is not limited to, a mobile phone, a tablet personal computer, a laptop computer, a personal digital assistant (PDA), a personal computer, a notebook, a vehicle-mounted device, and a wearable device (such as a watch).

Figure 1:
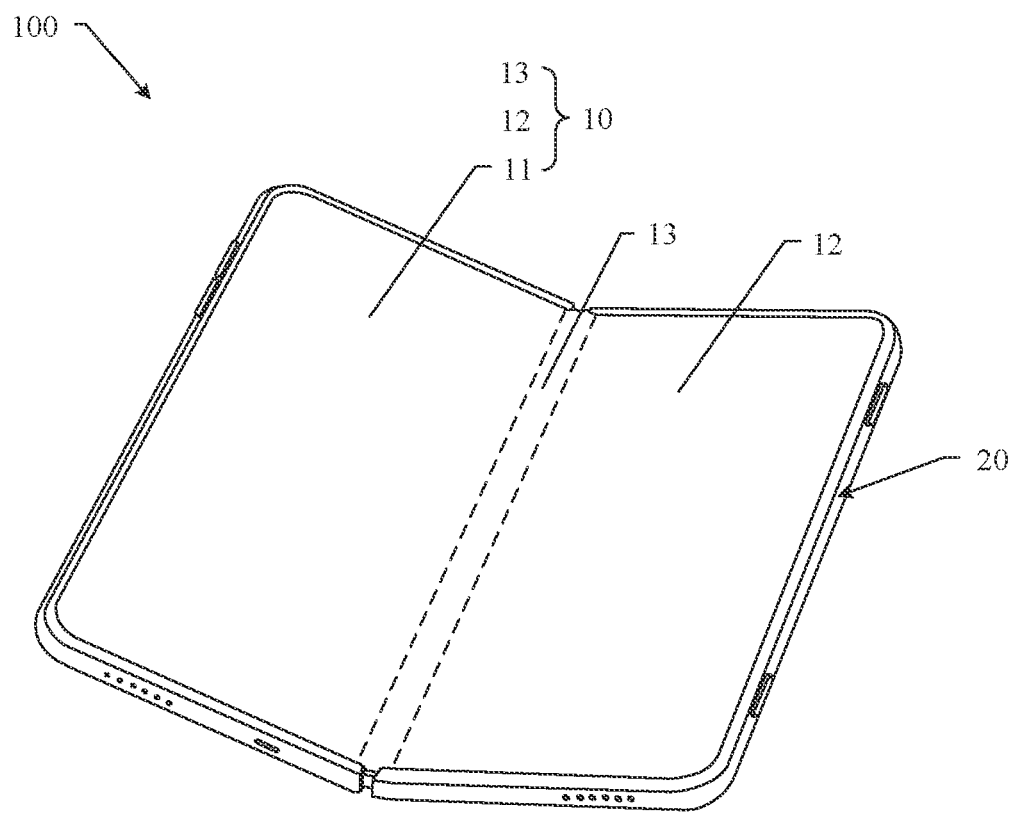
FIG. 1 is a perspective view of an electronic device according to some embodiments of this application.

FIG. 1 is a perspective view of an electronic device 100 according to some embodiments of this application. In this embodiment, the electronic device 100 is a mobile phone with a foldable screen. The electronic device 100 includes a foldable screen 10 and a support apparatus 20. It may be understood that FIG. 1 shows only an example of some components included in the electronic device 100, and actual shapes, actual sizes, actual positions, and actual structures of these components are not limited by FIG. 1.

The foldable screen 10 is configured to display an image, a video, and the like. The foldable screen 10 may be folded into a first part 11 and a second part 12. The foldable screen 10 further includes a third part 13 located between the first part 11 and the second part 12. At least the third part 13 of the foldable screen 10 is made of a flexible material. The first part 11 and the second part 12 may be made of a flexible material, or may be made of a rigid material, or part of the first part 11 and the second part 12 is made of a rigid material, and the other part thereof is made of a flexible material. This is not specifically limited herein.

Specifically, the foldable screen 10 may be an organic light-emitting diode (OLED) screen, a micro organic light-emitting diode (micro OLED) screen, a quantum dot light emitting diode (QLED) screen, a liquid crystal display (LCD), or the like.

The foldable screen 10 can be switched between an unfolded state and a folded state.

Figure 2:
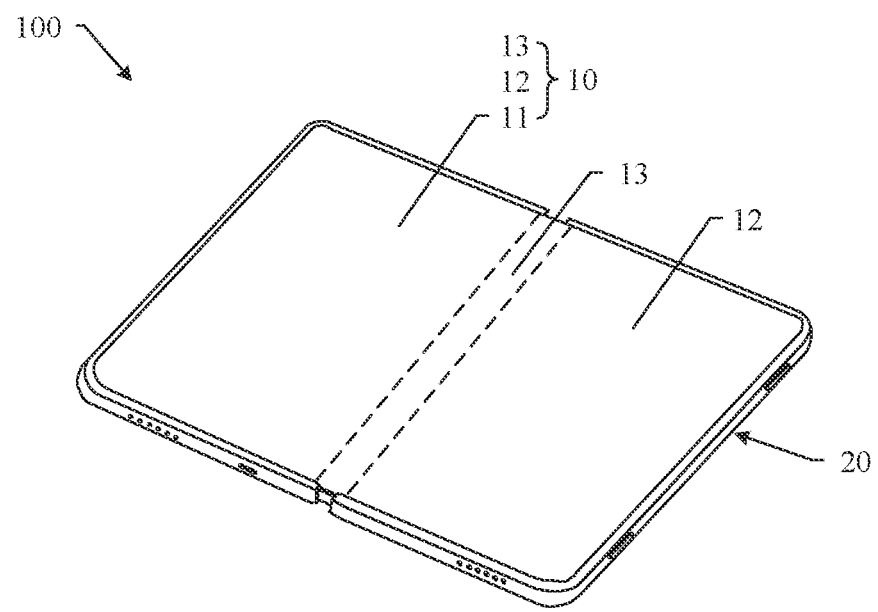
FIG. 2 is a schematic diagram of a structure of the electronic device shown in FIG. 1 when a foldable screen is in an unfolded state.

FIG. 2 is a schematic diagram of a structure of the electronic device 100 shown in FIG. 1 when a foldable screen 10 is in an unfolded state. When the foldable screen 10 is in the unfolded state, the first part 11, the second part 12, and the third part 13 are coplanarly disposed and face a same direction. In this state, large-screen display can be implemented, which can provide richer information to a user and bring better use experience to the user.

Figure 3:
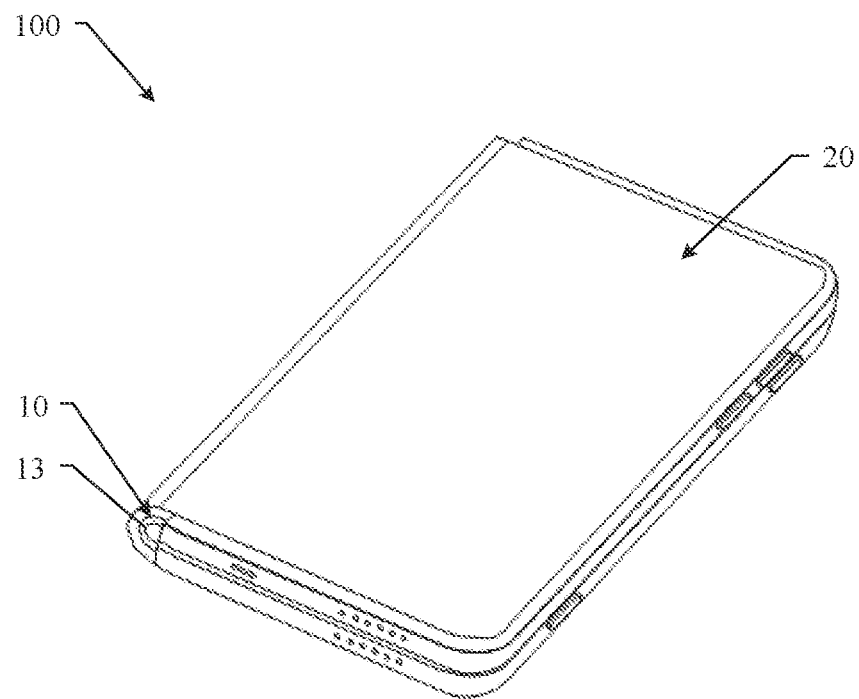
FIG. 3 is a schematic diagram of a structure of the electronic device shown in FIG. 1 when the foldable screen is in a folded state.

FIG. 3 is a schematic diagram of a structure of the electronic device 100 shown in FIG. 1 when a foldable screen 10 is in a folded state. When the foldable screen 10 is in a folded state, the third part 13 is in a bent state, and the first part (not shown in FIG. 3) is opposite to the second part (not shown in FIG. 3). The foldable screen 10 is invisible to the user, and the support apparatus 20 is protected outside the foldable screen 10 to prevent the foldable screen 10 from being scratched by a hard object.

Figure 4:
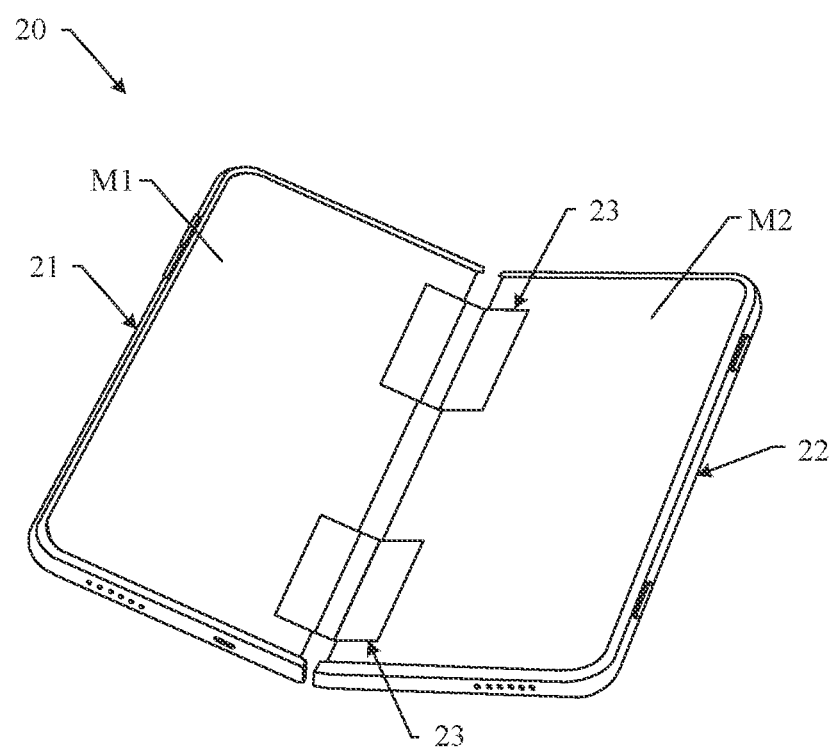
FIG. 4 is a perspective view of a support apparatus in the electronic device shown in FIG. 1.

The support apparatus 20 is configured to support the foldable screen 10 and allow the foldable screen 10 to be switched between an unfolded state and a folded state. FIG. 4 is a perspective view of a support apparatus 20 in the electronic device 100 shown in FIG. 1. In this embodiment, the support apparatus 20 includes a first housing 21, a second housing 22, and a rotating mechanism 23. It may be understood that FIG. 4 shows only an example of some components included in the support apparatus 20, and actual shapes, actual sizes, actual positions, and actual structures of these components are not limited by FIG. 4.

The first housing 21 is configured to fix and support the first part 11 of the foldable screen 10 in FIG. 1. Specifically, the first housing 21 has a lamination surface M1, and the first housing 21 is configured to fix and support the first part 11 of the foldable screen 10 in FIG. 1 by using the lamination surface M1.

The second housing 22 is configured to fix and support the second part 12 of the foldable screen 10 in FIG. 1. Specifically, the second housing 22 has a lamination surface M2, and the second housing 22 is configure to fix and support the second part 12 of the foldable screen 10 in FIG. 1 by using the lamination surface M2.

A first accommodating cavity (not shown in the figure) is formed inside the first housing 21. A second accommodating cavity (not shown in the figure) is formed inside the second housing 22. The first accommodating cavity and the second accommodating cavity are configured to accommodate electronic devices such as a mainboard, a battery, a camera module, a speaker, and an earpiece of the electronic device 100.

The first housing 21 may be of an integral structure, or may be formed by assembling a plurality of parts. Similarly, the second housing 22 may be an integral mechanical part or may be formed by assembling a plurality of parts.

Figure 5:
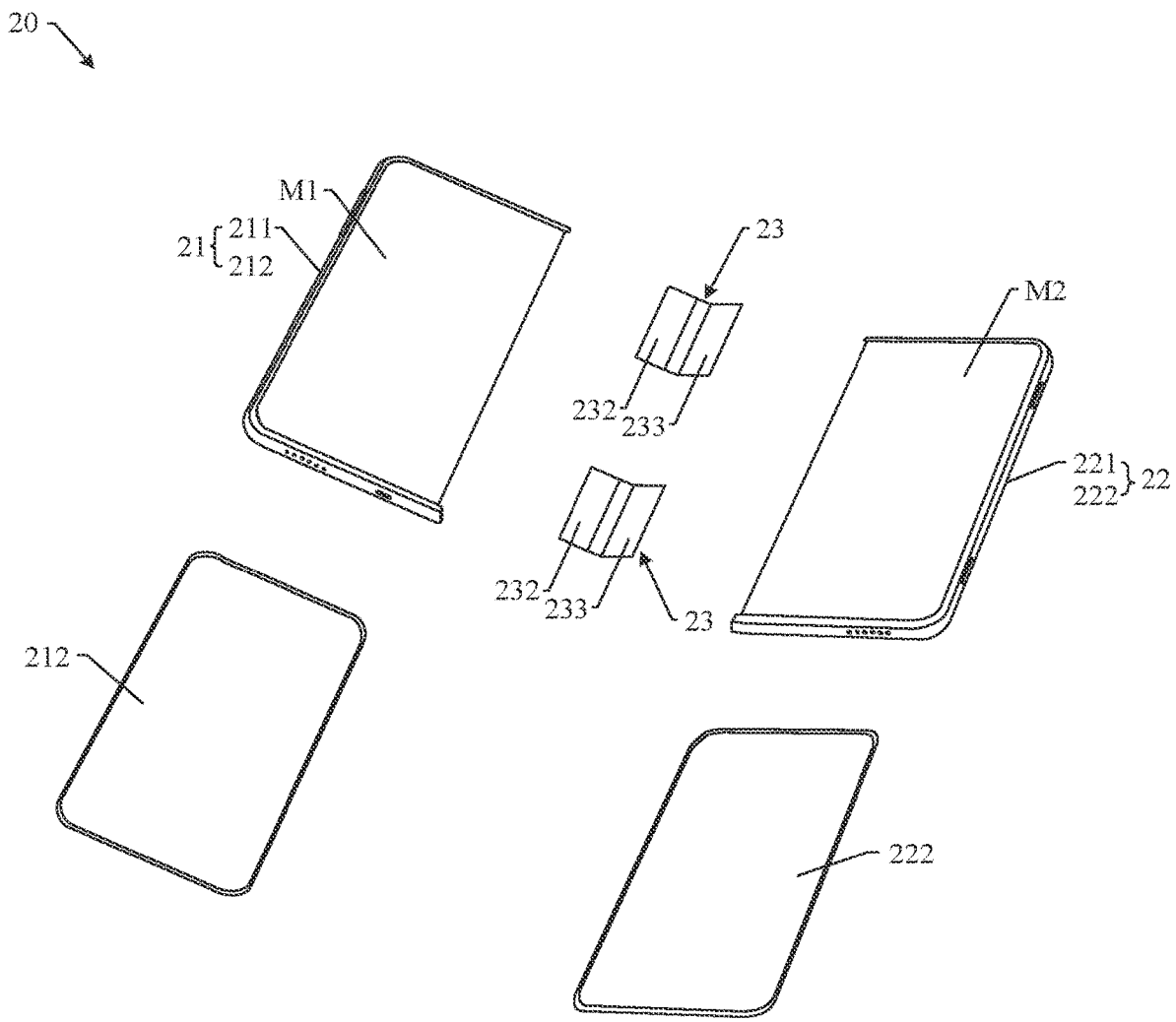
FIG. 5 is an exploded view of the support apparatus shown in FIG. 4.

In some embodiments, FIG. 5 is an exploded view of the support apparatus 20 shown in FIG. 4. A first housing 21 includes a first middle frame 211 and a first back cover 212. A lamination surface M1 is located on the first middle frame 211. The first back cover 212 is fixed to a side of the first middle frame 211 that faces away from the lamination surface M1. The first accommodating cavity is formed between the first middle frame 211 and the first back cover 212.

The second housing 22 includes a second middle frame 221 and a second back cover 222. A lamination surface M2 is located on the second middle frame 221. The second back cover 222 is fixed to a side of the second middle frame 221 that faces away from the lamination surface M2. The second accommodating cavity is formed between the second middle frame 221 and the second back cover 222.

The rotating mechanism 23 is configured to support the third part 13 of the foldable screen 10. The rotating mechanism 23 is connected between the first housing 21 and the second housing 22, and the first housing 21 is rotatably connected to the second housing 22 by using the rotating mechanism 23. In some embodiments, the rotating mechanism 23 is connected between the first middle frame 211 of the first housing 21 and the second middle frame 221 of the second housing 22. In another embodiment, the rotating mechanism 23 may alternatively be connected between the first back cover 212 of the first housing 21 and the second back cover 222 of the second housing 22.

One, two or more rotating mechanisms 23 may be provided. FIG. 4 and FIG. 5 show only an example in which two rotating mechanisms 23 are provided. This should not be considered as a special limitation to this application. The two rotating mechanisms 23 are spaced from each other in a length direction of a folding axis of the foldable screen 10.

Figure 6:
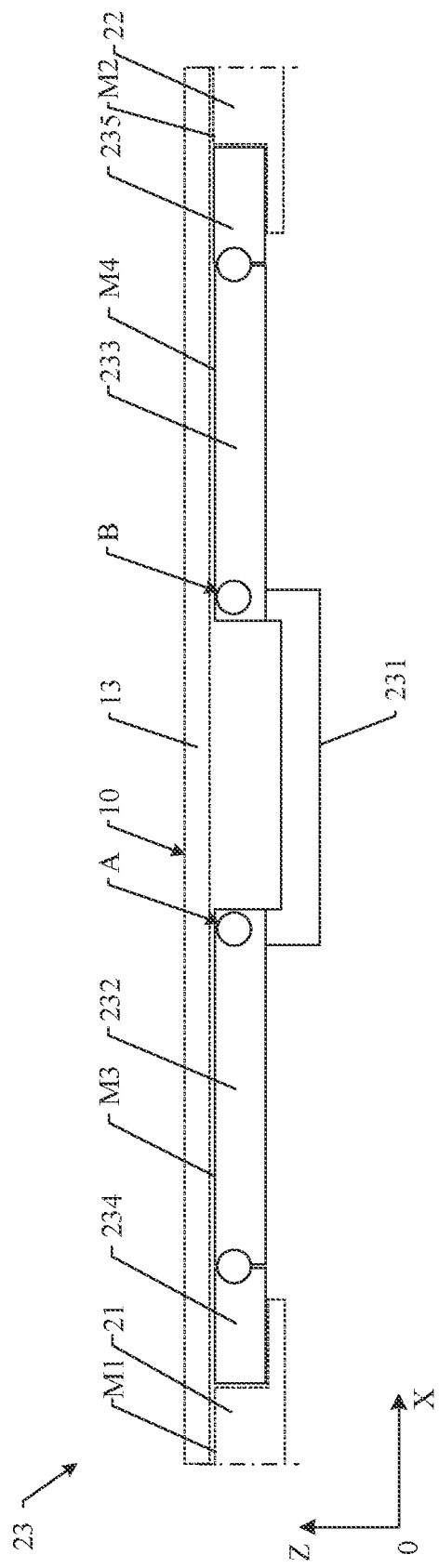
FIG. 6 is a schematic diagram of a structure of a rotating mechanism according to some embodiments of this application.

FIG. 6 is a schematic diagram of a structure of a rotating mechanism 23 according to some embodiments of this application. In this embodiment, the rotating mechanism 23 includes a base 231, a first door panel 232, a second door panel 233, a first connector 234, and a second connector 235. It may be understood that FIG. 6 shows only an example of some components included in the rotating mechanism 23, and actual shapes, actual sizes, actual positions, and actual structures of these components are not limited by FIG. 6.

The first door panel 232 is hinged to the base 231. The first connector 234 is hinged to the first door panel 232. The first connector 234 is configured to be fixedly connected to the first housing 21 in a manner such as gluing, threaded connection, or riveting.

The second door panel 233 is hinged to the base 231. The second connector 235 is hinged to the second door panel 233. The second connector 235 is configured to be fixedly connected to the second housing 22 in a manner such as gluing, threaded connection, or riveting.

The first door panel 232 has a lamination surface M3, and the second door panel 233 has a lamination surface M4. The lamination surface M3 and the lamination surface M4 are used for lamination to the third part 13 of the foldable screen 10.

Figure 7A:
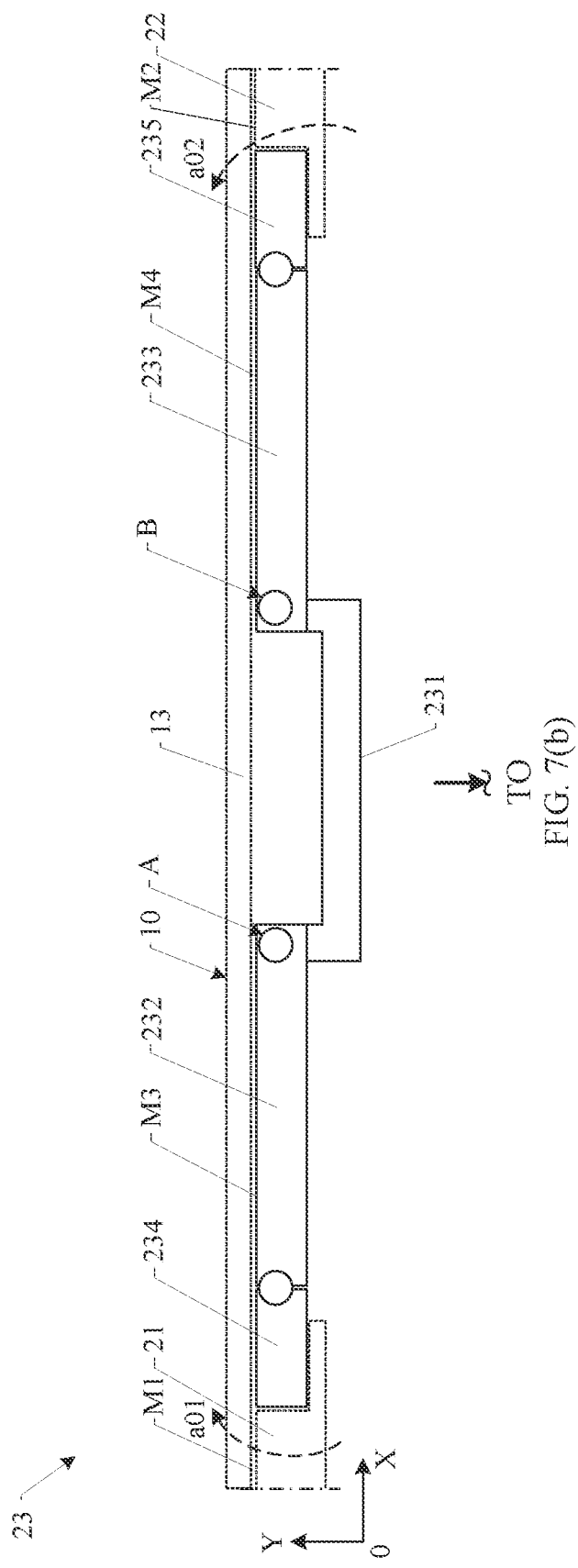
FIG. 7(*a*) and FIG. 7(*b*) are a schematic diagram of a structure of the rotating mechanism shown in FIG. 6 in an unfolded state and a folded state, where FIG. 7(*a*) is a schematic diagram of a structure when the rotating mechanism is in the unfolded state.
Figure 7B:
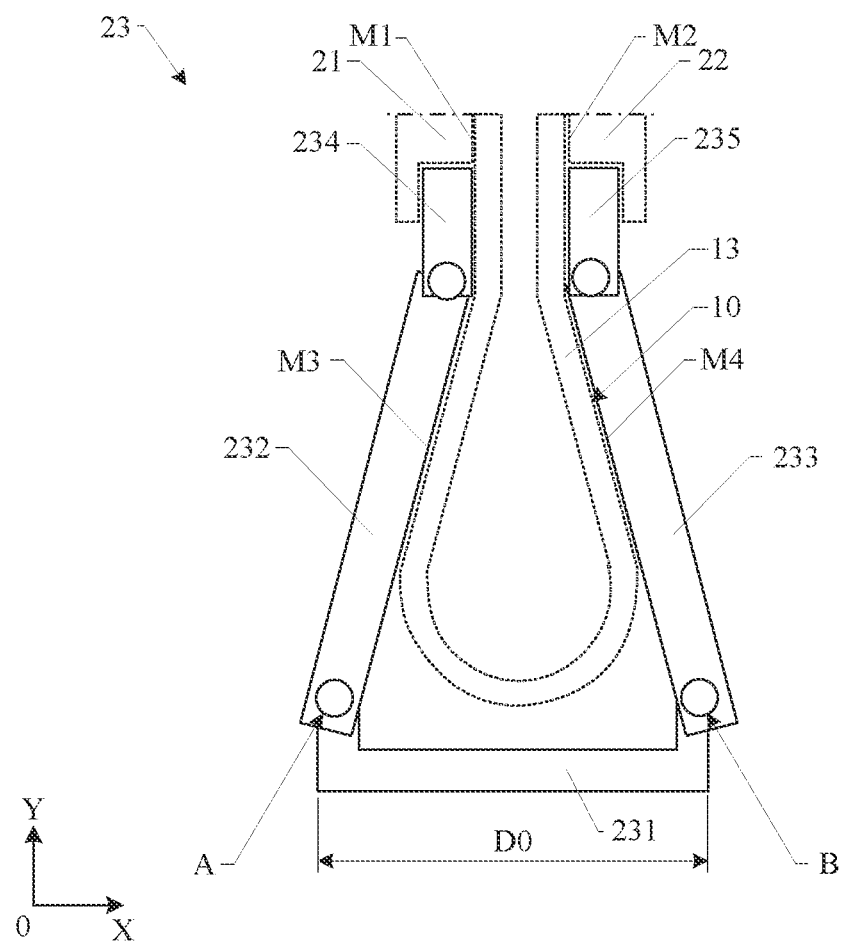

The rotating mechanism 23 can rotate between an unfolded state and a folded state. FIG. 7(a) and FIG. 7(b) are a schematic diagram of a structure of the rotating mechanism 23 shown in FIG. 6 in an unfolded state and a folded state. Specifically, FIG. 7(a) is a schematic diagram of a structure of the rotating mechanism 23 in the unfolded state. In this state, a lamination surface M1, a lamination surface M2, a lamination surface M3, and a lamination surface M4 are coplanarly disposed and face a same direction, so as to ensure that the foldable screen 10 supported thereon is flat. When the first housing 21 and the second housing 22 rotate in a direction a01 and a direction a02, respectively, a schematic diagram of a structure of the rotating mechanism 23 shown in FIG. 7(b) in the folded state may be obtained. In this state, the lamination surface M1 faces the lamination surface M2, and the third part 13 of the foldable screen 10 is folded into a water drop shape.

It is assumed that a hinge shaft between the first door panel 232 and the base 231 is a first hinge shaft A, and a hinge shaft between the second door panel 233 and the base 231 is a second hinge shaft B. To facilitate description of this embodiment and the following implementations, an XYZ coordinate system is established. Specifically, a length direction of the first hinge shaft A and the second hinge shaft B is defined as a Y-axis direction, a direction in which the first hinge shaft A and the second hinge shaft B are arranged is an X-axis direction, and a direction perpendicular to the X-axis direction and the Y-axis direction is a Z-axis direction. It may be understood that a coordinate system of the rotating mechanism 23 may be flexibly set according to an actual need, and this application only gives an example, which cannot be considered as a special limitation to this application.

Figure 8:
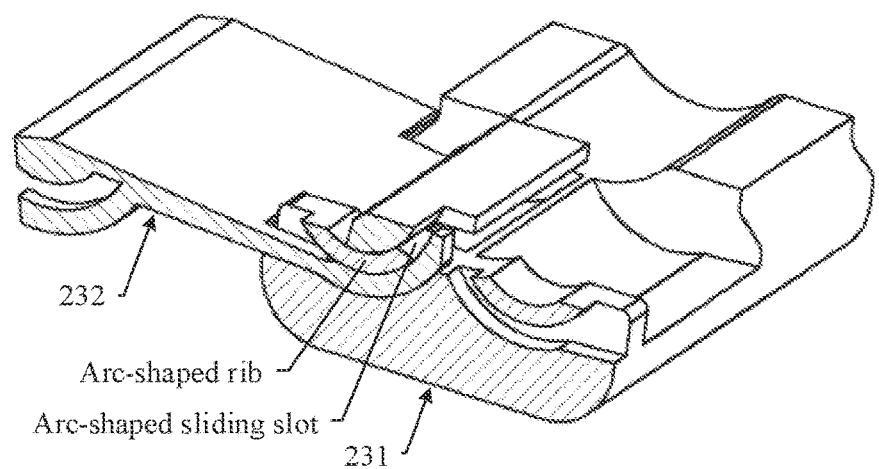
FIG. 8 is a schematic diagram of a structure of a first hinge shaft in the rotating mechanism shown in FIG. 6.

In the rotating mechanism 23 shown in FIG. 6 and FIG. 7(a) and FIG. 7(b), the first hinge shaft A and the second hinge shaft B usually use a matching form of an arc-shaped rib and an arc-shaped sliding slot shown in FIG. 8. The arc-shaped rib is disposed on the base 231, and the arc-shaped sliding slot is disposed in a door panel (only a first door panel 232 is shown in FIG. 8). In another embodiment, the arc-shaped rib may be disposed on the door panel, and the arc-shaped sliding slot may be disposed in the base 231. This hinge shaft structure is conducive to the thin design of the base 231, the first door panel 232, and the second door panel 233. When the rotating mechanism 23 rotates between the unfolded state and the folded state, a rotation angle of the first door panel 232 and the second door panel 233 relative to the base 231 determines a design size of the central angle corresponding to the arc-shaped rib. A larger rotation angle of the first door panel 232 and the second door panel 233 relative to the base 231 indicates a larger designed central angle of the arc-shaped rib. When a radius is certain, a larger length of the arc-shaped rib indicates a larger width which the arc-shaped rib occupies in the X-axis direction. In addition, because the first connector 234 is connected to the base 231 only by using the first door panel 232, and the second connector 235 is connected to the base 231 only by using the second door panel 233, structural strength of the first hinge shaft A and the second hinge shaft B plays a decisive role in connection stability between the first housing 21 and the second housing 22, so that diameters of the first hinge shaft A and the second hinge shaft B are usually designed to be relatively large to ensure connection strength between the first housing 21 and the second housing 22. Therefore, the arc-shaped rib has a relatively large length, the base 231 has a relatively large width DO in the X-axis direction (refer to FIG. 7(a) and FIG. 7(b)), and the electronic device 100 has a relatively large thickness in the folded state, which is not conducive to the thin design of the electronic device in the folded state. When the electronic device 100 is in the unfolded state, a width of the third part 13 supported on the rotating mechanism 23 is relatively large, which is not conducive to a compact design of the structure of the electronic device.

Figure 9:
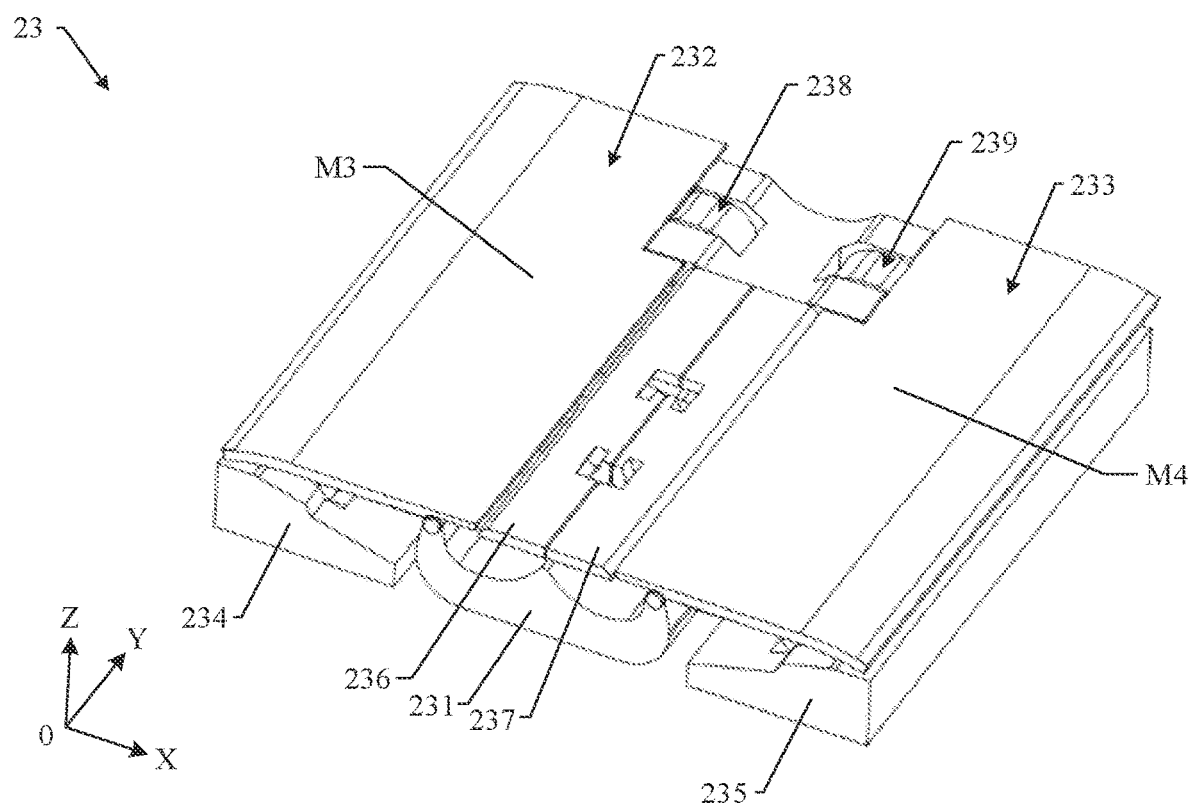
FIG. 9 is a perspective view of a structure of a rotating mechanism according to some further embodiments of this application.
Figure 10:
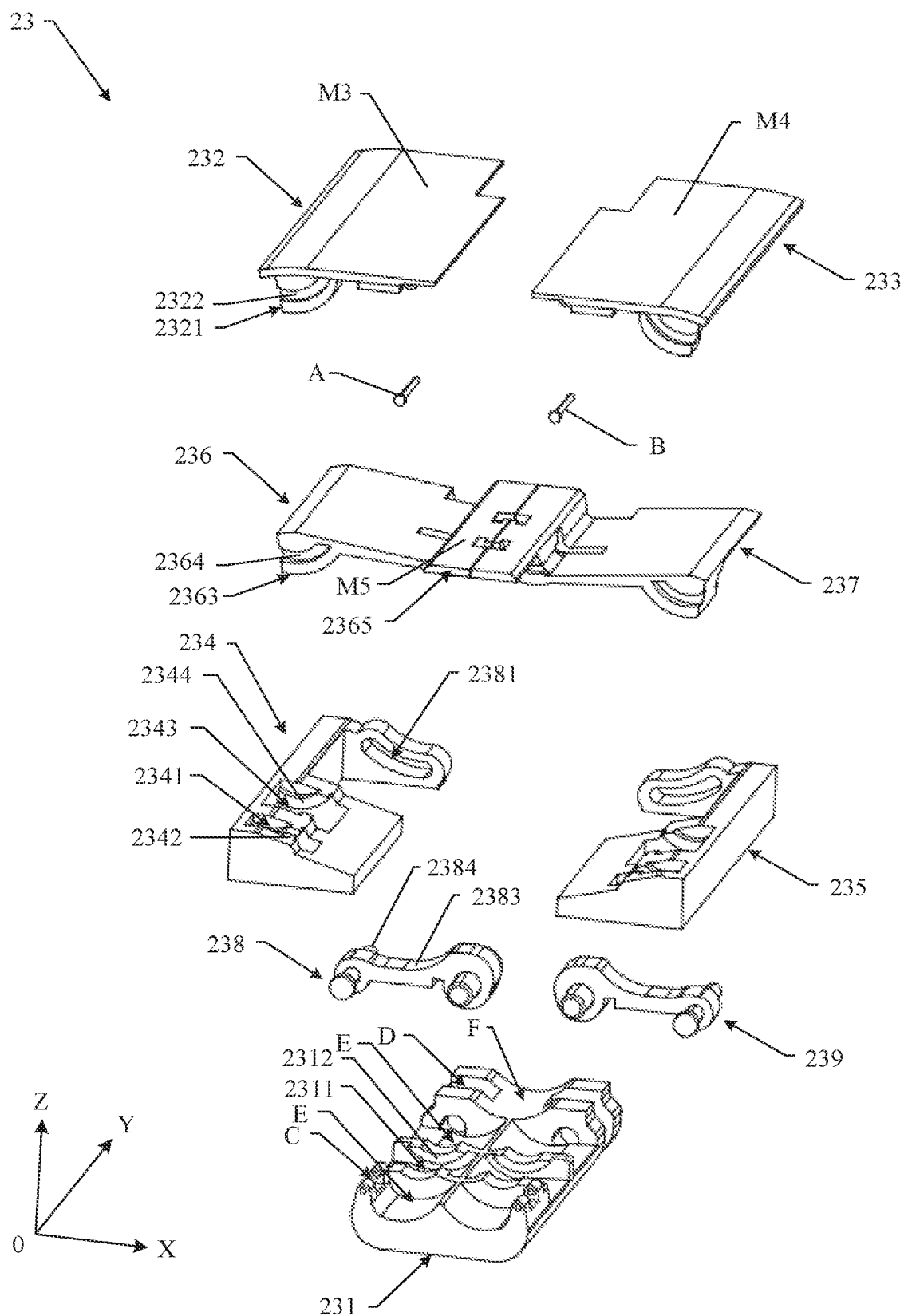
FIG. 10 is an exploded view of the rotating mechanism shown in FIG. 9.

To avoid the foregoing problems, FIG. 9 is a perspective view of a rotating mechanism 23 according to some further embodiments of this application, and FIG. 10 is an exploded view of the rotating mechanism 23 shown in FIG. 9. In this embodiment, in addition to a base 231, a first door panel 232, a second door panel 233, a first connector 234, and a second connector 235, the rotating mechanism 23 further includes a first main swing arm 236 and a second main swing arm 237.

The first door panel 232 is hinged to a position C of the base 231 by using a first hinge shaft A.

The first connector 234 is hinged to the first door panel 232. In some embodiments, referring to FIG. 10, the first connector 234 is provided with a first hinge slot 2341. An inner wall of the first hinge slot 2341 is provided with a first arc-shaped rib 2342. In some embodiments, two first arc-shaped ribs 2342 are provided, the two first arc-shaped ribs 2342 are disposed on two opposite inner walls of the first hinge slot 2341 respectively, and circle center lines of the two first arc-shaped ribs 2342 are collinear. In another embodiment, one first arc-shaped rib 2342 may be provided. The first door panel 232 is provided with a first hinge block 2321. The first hinge block 2321 may be fixed to the first door panel 232 through gluing, or may be integrally formed with the first door panel 232, that is, the first hinge block 2321 and the first door panel 232 are an integral mechanical part. The first hinge block 2321 is provided with a first arc-shaped elongated slot 2322. In some embodiments, two first arc-shaped elongated slots 2322 are provided, the two first arc-shaped elongated slots 2322 are disposed on two opposite side walls of the first hinge block 2321 respectively, and the circle center lines of the two first arc-shaped elongated slots 2322 are collinear. In another embodiment, one first arc-shaped elongated slot 2322 may be provided. The first hinge block 2321 is matched and accommodated in the first hinge slot 2341, and two first arc-shaped ribs 2342 are matched and accommodated in two first arc-shaped elongated slot 2322, respectively. Therefore, hinging between the first connector 234 and the first door panel 232 is implemented. The structure is simple, which is conducive to reducing the thicknesses of the first connector 234 and the first door panel 232. In another embodiment, the first arc-shaped elongated slot 2322 may alternatively be disposed in the first hinge slot 2341, and the first arc-shaped rib 2342 may alternatively be disposed on the first hinge block 2321.

The first connector 234 is configured to be fixed to a first housing 21. Specifically, the first connector 234 may be fixed to the first housing 21 in a manner such as threaded connection, riveting, welding, or bonding, or may be integrally formed with a first middle frame 211 of the first housing 21. That is, the first connector 234 and the first middle frame 211 are an integral mechanical part.

The first main swing arm 236 is located on a side of the first door panel 232 away from a lamination surface M3.

Figure 11:
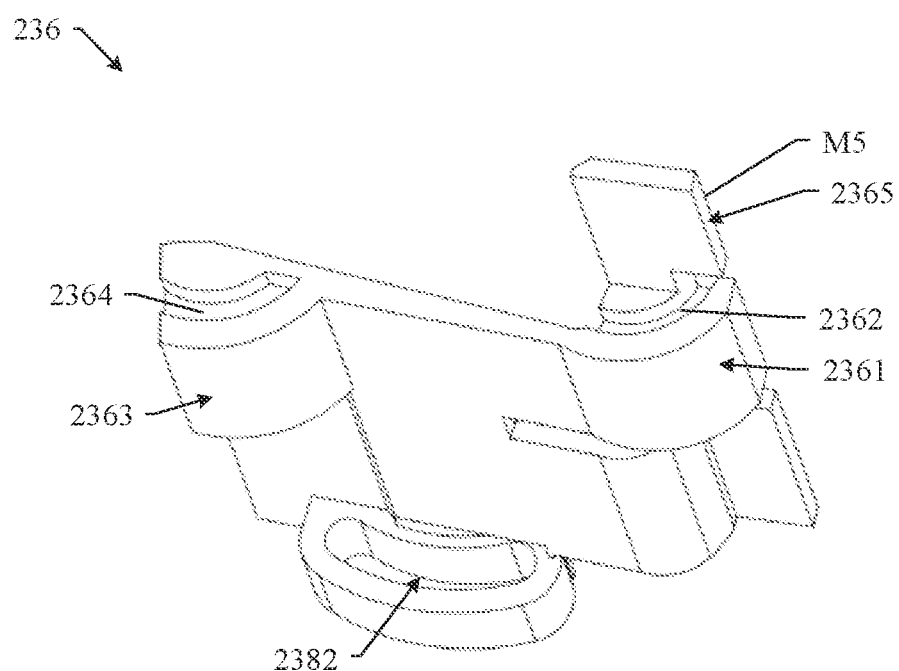
FIG. 11 is a schematic diagram of a structure of a first main swing arm in the rotating mechanism shown in FIG. 10 when viewed from bottom to top.

One end of the first main swing arm 236 is hinged to the base 231. In some embodiments, referring to FIG. 10, the base 231 is provided with a second hinge slot 2311. An inner wall of the second hinge slot 2311 is provided with a second arc-shaped rib 2312. FIG. 11 is a schematic diagram of a structure of a first main swing arm 236 in the rotating mechanism 23 shown in FIG. 10 when viewed from bottom to top. The first main swing arm 236 is provided with a second hinge block 2361. The second hinge block 2361 may be fixed to the first main swing arm 236 through gluing, or may be integrally formed with the first main swing arm 236. The second hinge block 2361 is provided with a second arc-shaped elongated slot 2362. The second hinge block 2361 is matched and accommodated in the second hinge slot 2311 in FIG. 10, and the second arc-shaped rib 2312 in FIG. 10 is matched and accommodated in the second arc-shaped elongated slot 2362. Therefore, hinging between the first main swing arm 236 and the base 231 is implemented. The structure is simple, which is conducive to reducing the thicknesses of the first main swing arm 236 and the base 231. In another embodiment, the second arc-shaped elongated slot 2362 may alternatively be disposed in the second hinge slot 2311, and the second arc-shaped rib 2312 may alternatively be disposed on the second hinge block 2361.

The other end of the first main swing arm 236 is hinged to the first connector 234. In some embodiments, referring to FIG. 10, the first connector 234 is provided with a third hinge slot 2343. An inner wall of the third hinge slot 2343 is provided with a third arc-shaped rib 2344. Referring to FIG. 10 and FIG. 11, the first main swing arm 236 is provided with a third hinge block 2363. The third hinge block 2363 may be fixed to the first main swing arm 236 through gluing, or may be integrally formed with the first main swing arm 236. The third hinge block 2363 is provided with a third arc-shaped elongated slot 2364. The third hinge block 2363 is matched and accommodated in the third hinge slot 2343, and the third arc-shaped rib 2344 is matched and accommodated in the third arc-shaped elongated slot 2364. Therefore, hinging between the first main swing arm 236 and the first connector 234 is implemented. The structure is simple, which is conducive to reducing the thicknesses of the first main swing arm 236 and the first connector 234. In another embodiment, the third arc-shaped elongated slot 2364 may alternatively be disposed in the third hinge slot 2343, and the third arc-shaped rib 2344 may alternatively be disposed on the third hinge block 2363.

A connection relationship between the base 231, the second door panel 233, the second connector 235, and the second main swing arm 237 is the same as that between the foregoing base 231, the first door panel 232, the first connector 234, and the first main swing arm 236. Details are not described herein again.

According to the foregoing description, the base 231, the first door panel 232, the first connector 234, and the first main swing arm 236 may be equivalent to a first hinged four-bar mechanism. The base 231, the second door panel 233, the second connector 235, and the second main swing arm 237 may be equivalent to a second hinged four-bar mechanism.

Figure 12A:
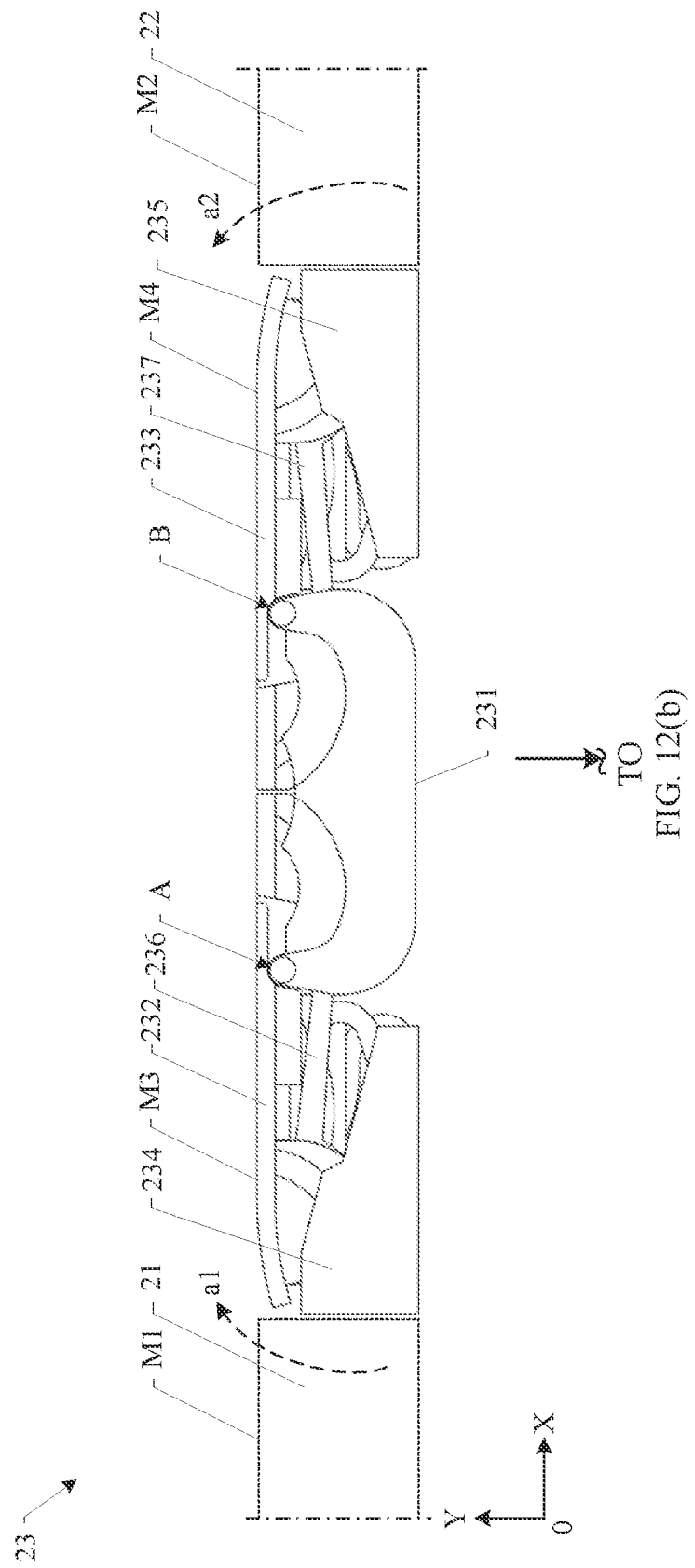
FIG. 12(*a*) and FIG. 12(*b*) are a schematic diagram of a structure of the rotating mechanism shown in FIG. 9 in an unfolded state and a folded state, where FIG. 12(*a*) is a schematic diagram of a structure when the rotating mechanism is in the unfolded state.
Figure 12B:
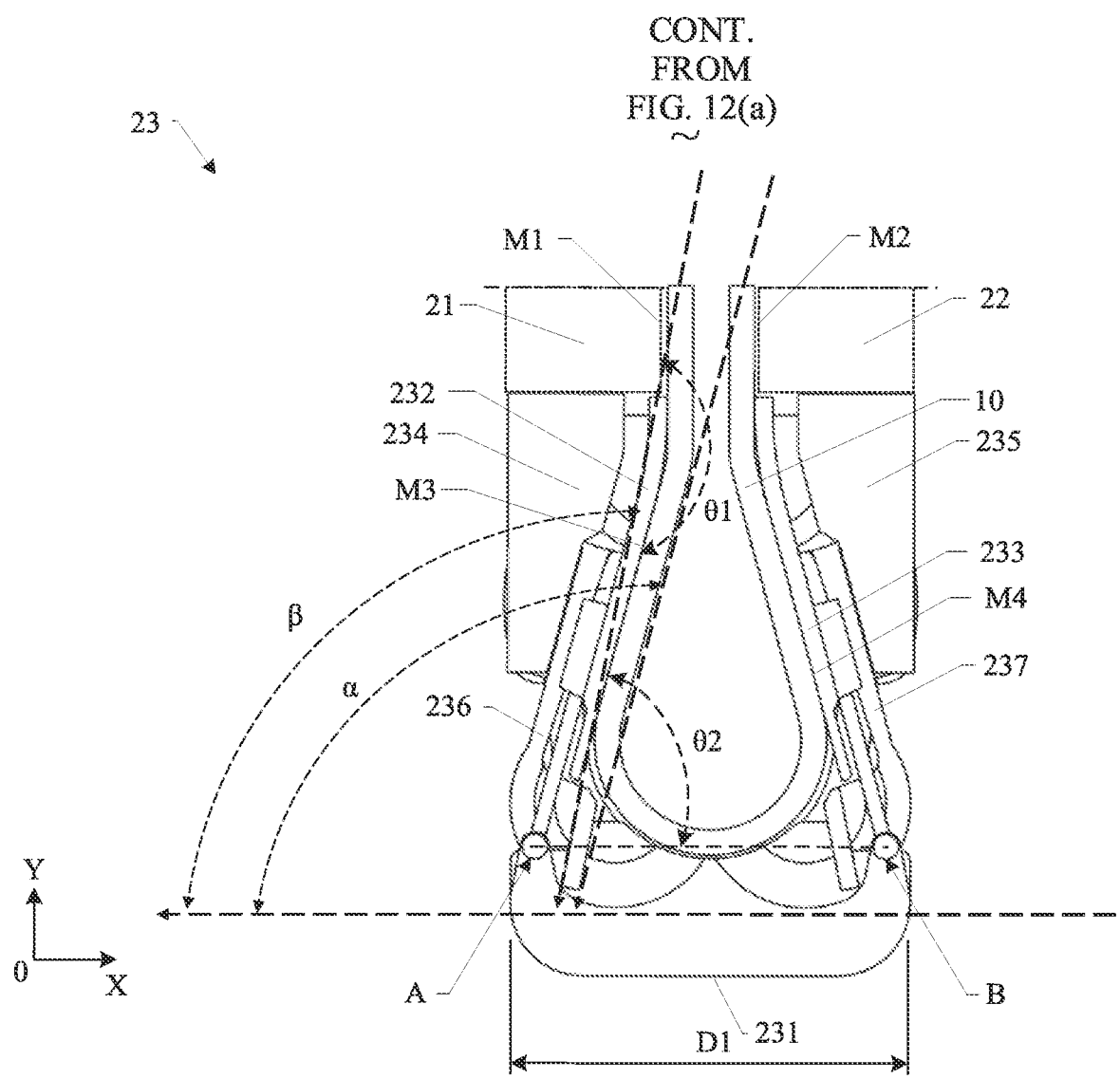

The rotating mechanism 23 can rotate between an unfolded state and a folded state. FIG. 12(a) and FIG. 12(b) are a schematic diagram of a structure of the rotating mechanism 23 shown in FIG. 9 in an unfolded state and a folded state. Specifically, FIG. 12(a) is a schematic diagram of a structure of the rotating mechanism 23 in the unfolded state. In this state, a lamination surface M1, a lamination surface M2, a lamination surface M3, and a lamination surface M4 are coplanarly disposed and face a same direction, so as to ensure that the foldable screen 10 supported thereon is flat. When the first housing 21 and the second housing 22 rotate in a direction a1 and a direction a2, respectively, a schematic diagram of a structure of the rotating mechanism 23 shown in FIG. 12(b) in the folded state may be obtained. In this state, the lamination surface M1 faces the lamination surface M2, and the third part of the foldable screen 10 is folded into a water drop shape, so as to improve reliability of the foldable screen 10 and prolong a service life of the foldable screen 10.

When the rotating shaft mechanism 23 rotates between an unfolded state and a folded state, a rotation angle $\beta$ of the first main swing arm 236 relative to the base 231 is smaller than a rotation angle $\alpha$ of the first door panel 232 relative to the base 231. Similarly, a rotation angle of the second main swing arm 237 relative to the base 231 is smaller than a rotation angle of the second door panel 233 relative to the base 231.

In the foregoing first hinged four-bar mechanism, in addition to being connected to the base 231 by using the first door panel 232, the first connector 234 is further connected to the base 231 by using the first main swing arm 236. Therefore, structural strength of a first hinge shaft A no longer plays a decisive role in connection stability between the first housing 21 and the second housing 22. A diameter of the first hinge shaft A may be designed to be relatively small, provided that a hinging function is met, and connection strength may be ensured mainly by using a hinge part (including the second hinge slot 2311 in FIG. 10 and the second hinge block 2361 in FIG. 11) between the first main swing arm 236 and the base 231. On this basis, when the rotating shaft mechanism 23 rotates between the unfolded state and the folded state, the rotation angle of the first main swing arm 236 relative to the base 231 is smaller than the rotation angle of the first door panel 232 relative to the base 231, so that a central angle of the second arc-shaped rib 2312 on the inner wall of the second hinge slot 2311 may be designed to be relatively small, and a length of the second arc-shaped rib 2312 may be designed to be relatively small, thereby reducing a width D1 of the base 231 in the X-axis direction (refer to FIG. 12(a) and FIG. 12(b)) and a thickness of an electronic device 100 in a folded state. When the electronic device 100 is in the unfolded state, a width of the third part 13 supported on the rotating mechanism 23 is relative small, which is conducive to a compact design of the structure of the electronic device.

Similarly, in the foregoing second hinged four-bar mechanism, in addition to being connected to the base 231 by using the second door panel 233, the second connector 235 is further connected to the base 231 by using the second main swing arm 23. Therefore, structural strength of a second hinge shaft B no longer plays a decisive role in connection stability between the first housing 21 and the second housing 22. A diameter of the second hinge shaft B may be designed to be relatively small, provided that a hinging function is met, and connection strength may be ensured mainly by using a hinge part between the second main swing arm 23 and the base 231. On this basis, when the rotating shaft mechanism 23 rotates between the unfolded state and the folded state, the rotation angle of the second main swing arm 237 relative to the base 231 is smaller than the rotation angle of the second door panel 233 relative to the base 231, so that a central angle of the arc-shaped rib configured to hinge the second main swing arm 23 to the base 231 may be designed to be relatively small, and a length of the arc-shaped rib may be designed to be relatively small, thereby further reducing the width D1 of the base 231 in the X-axis direction and a thickness of an electronic device 100 in a folded state. When the electronic device 100 is in the unfolded state, a width of the third part 13 supported on the rotating mechanism 23 is relative small, which is conducive to a compact design of the structure of the electronic device.

In some embodiments, when the rotating mechanism 23 is in the folded state, referring FIG. 12(b), an included angle $\theta 1$ between the lamination surface M1 of the first housing 21 and the lamination surface M3 of the first door panel 232 on a side for lamination to the foldable screen 10 is greater than 180°, and an inclination angle θ2 of the lamination surface M3 of the first door panel 232 on the side for lamination to the foldable screen 10 relative to the base 231 is less than 90°. Similarly, when the rotating mechanism 23 is in the folded state, an included angle between the lamination surface M2 of the second housing 22 and the lamination surface M4 of the second door panel 233 on a side for lamination to the foldable screen 10 is greater than 180°, and an inclination angle of the lamination surface M4 of the second door panel 233 on the side for lamination to the foldable screen 10 relative to the base 231 is less than 90°. In this way, the third part of the foldable screen 10 may be folded into a water drop shape.

In this embodiment of this application, it should be noted that the rotating mechanism 23 may directly fix the second housing 22 to the base 231 without including the second door panel 233, the second connector 235, and the second main swing arm 237, and make the lamination surface M2 of the second housing 22 parallel to a plane YZ, so as to implement 900 opening and closing and folding.

Referring to FIG. 10 and FIG. 11 again, a third door panel 2365 is further fixed to the first main swing arm 236. The third door panel 2365 is located between the first door panel 232 and the second door panel 233. The third door panel 2365 has a lamination surface M5, and the lamination surface M5 is used for lamination to the foldable screen 10. Referring to FIG. 10, the base 231 is provided with an avoidance slot E. When the rotating mechanism 23 is in the unfolded state, the lamination surface M5 of the third door panel 2365, the lamination surface M3 of the first door panel 232, the lamination surface M1 of the first housing 21, the lamination surface M4 of the second door panel 233, and the lamination surface M2 of the second housing 22 are coplanarly disposed and face a same direction. When the rotating mechanism 23 is in the folded state, the third door panel 2365 rotates into the avoidance slot E. Therefore, a lamination area between the rotating mechanism 23 and the foldable screen 10 may be increased, and support stability of the foldable screen 10 is improved.

Still referring to FIG. 10, the base 231 is provided with a foldable-screen avoidance slot F, the foldable-screen avoidance slot F is configured to avoid the third part of the foldable screen 10 when the foldable screen 10 is in the folded state, so as to further increase the inward folding angle of the foldable screen 10 and prolong the service life of the foldable screen 10.

In the foregoing embodiments, the first door panel 232 may be an integral mechanical part, or may be formed by assembling a plurality of structures.

Figure 13:
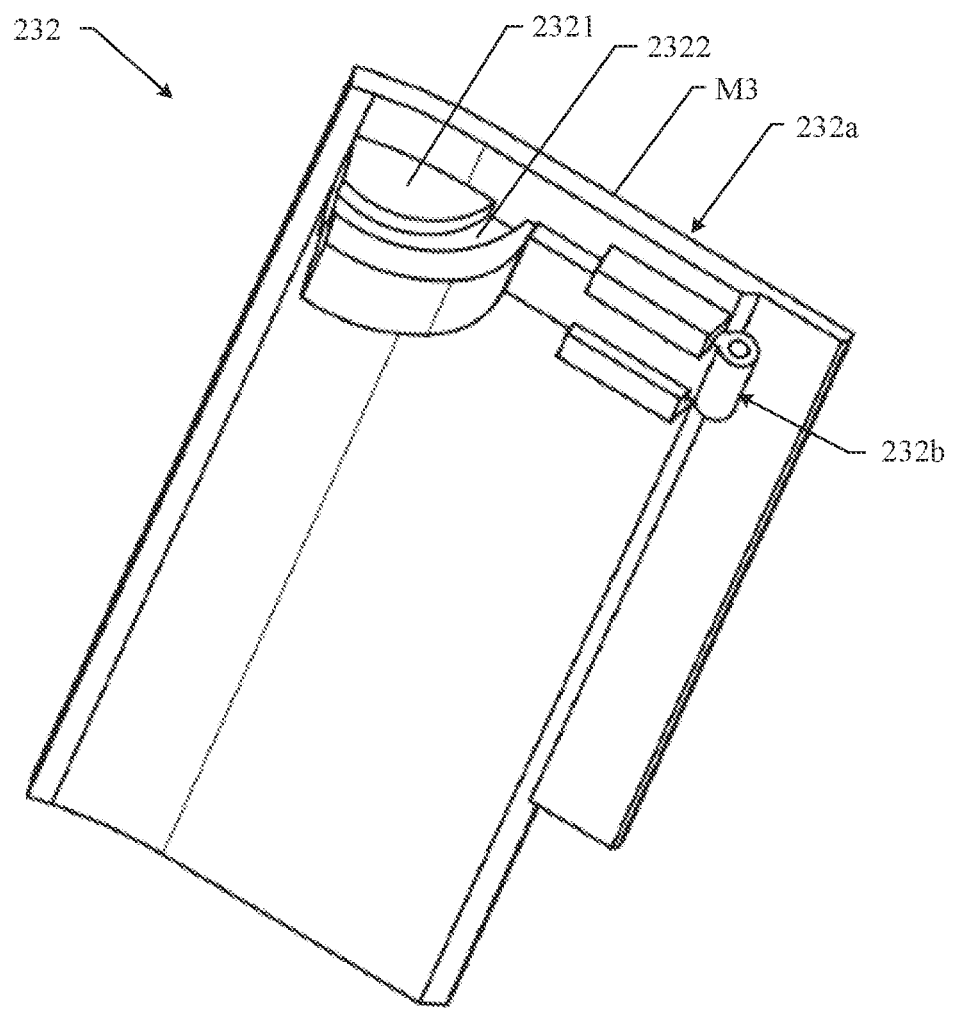
FIG. 13 is a schematic diagram of a structure of the first door panel in the rotating mechanism shown in FIG. 10 when viewed from bottom to top.
Figure 14:
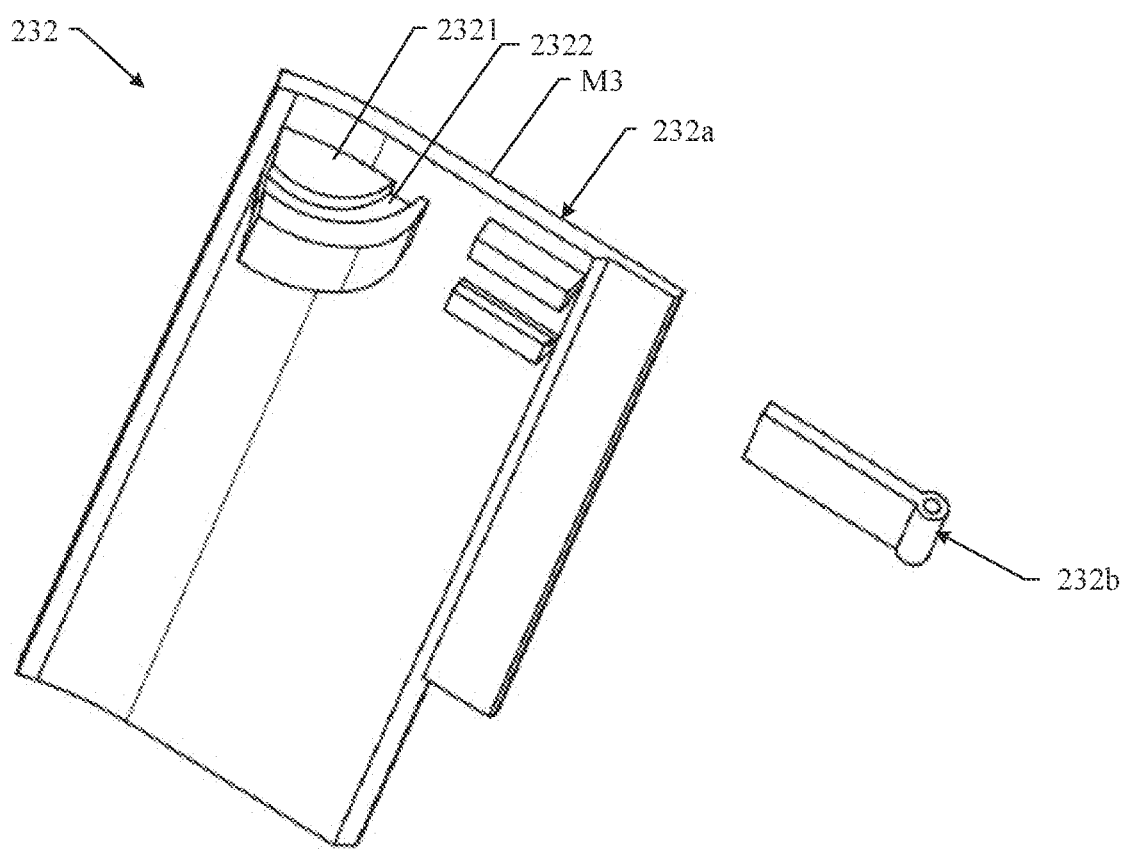
FIG. 14 is an exploded view of the first door panel shown in FIG. 13.

In some embodiments, FIG. 13 is a schematic diagram of a structure of the first door panel 232 in the rotating mechanism 23 shown in FIG. 10 when viewed from bottom to top, and FIG. 14 is an exploded view of the first door panel 232 shown in FIG. 13. In this embodiment, the first door panel 232 includes a door panel body 232a and a slide rail 232b. A first connector 234 is hinged to the door panel body 232a, and a lamination surface M3 is located on the door panel body 232a. An end of the slide rail 232b is hinged to a position C of the base 231 by using a first hinge shaft A. The door panel body 232a is slidably connected to the slide rail 232b. The slide rail 232b may be a sliding slot type slide rail, or may be a riding slide rail. In the embodiments shown in FIG. 13 and FIG. 14, the door panel body 232a is provided with a slide slot, and the slide rail 232b passes through the slide slot and can slide in the slide slot in a length direction of the slide rail 232b.

In some embodiments, a structural form of the second door panel 233 may be the same as that of the first door panel 232. Details are not described herein again.

On the basis of the foregoing embodiments, to avoid the third part 13 of the foldable screen when the rotating mechanism 23 is in the folded state, in this embodiment of this application, referring to FIG. 9 and FIG. 10 again, the rotating mechanism 23 further includes a first control assembly 238. The first control assembly 238 is configured to control the door panel body 232a of the first door panel 232 to slide along the slide rail 232b away from the base 231 when the rotating mechanism 23 rotates from the unfolded state to the folded state, thereby driving the base 231 to sink, so as to avoid the third part 13 of the foldable screen 10 and ensure that the third part 13 has a relatively large inward folding angle. The first control assembly 238 is further configured to control the door panel body 232a of the first door panel 232 to slide along the slide rail 232b close to the base 231 when the rotating mechanism 23 rotates from the folded state to the unfolded state, so as to lift the base 231, and enables the base 231 to support the foldable screen 10 when the rotating mechanism 23 is in the unfolded state, so as to ensure flatness of the foldable screen 10.

Figure 15:
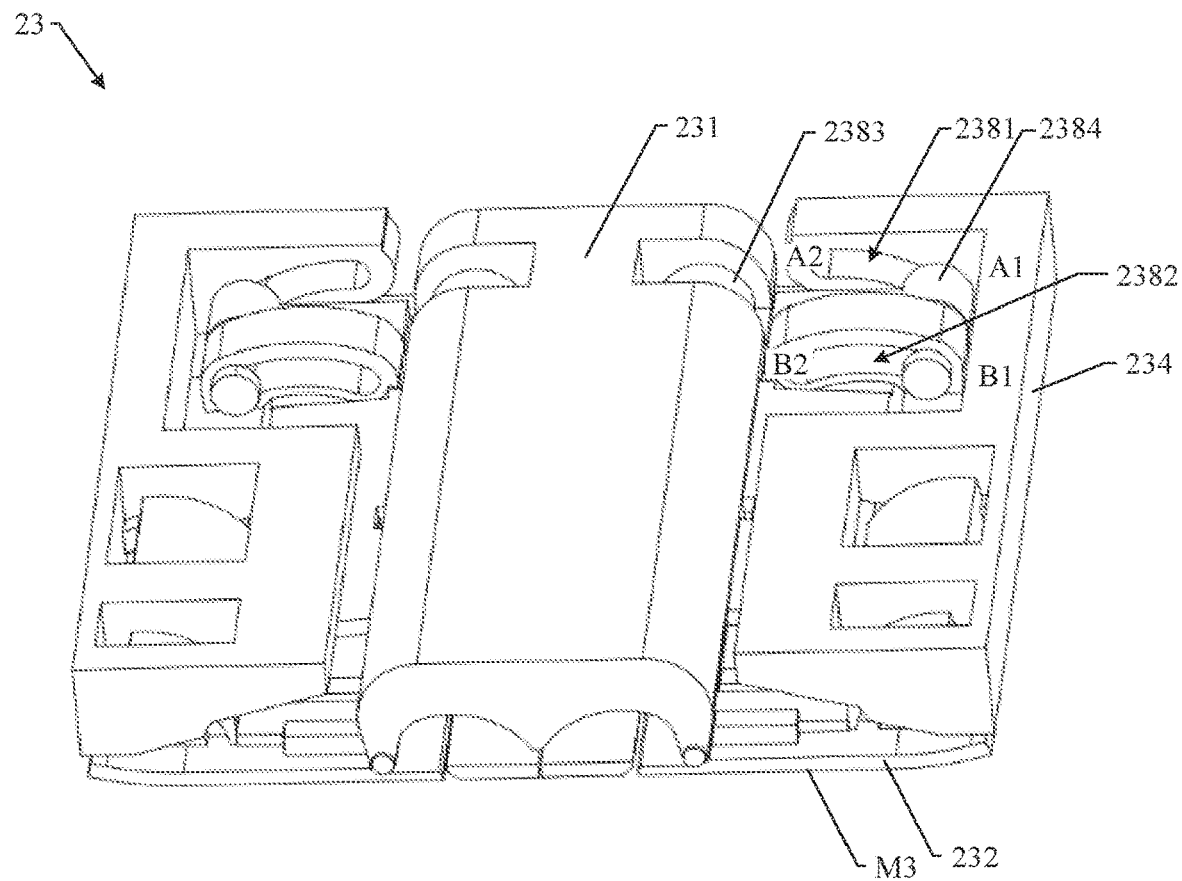
FIG. 15 is a schematic diagram of a back side structure of the rotating mechanism shown in FIG. 9.

The first control assembly 238 has a plurality of structural forms. In some embodiments, the first control assembly 238 may be a hinged four-bar mechanism. In some other embodiments, referring to FIG. 10 and FIG. 11, the first control assembly 238 includes a first sliding slot 2381, a second sliding slot 2382, and an auxiliary swing arm 2383 (refer to FIG. 10). Referring to FIG. 10, the first sliding slot 2381 is disposed in the first connector 234. Referring to FIG. 11, the second sliding slot 2382 is disposed in the first main swing arm 236. Referring to FIG. 10 again, one end of the auxiliary swing arm 2383 is hinged to a position D of the base 231, and the other end of the auxiliary swing arm 2383 is provided with a sliding member 2384. The sliding member 2384 may be a pin shaft, or may be a roller. FIG. 15 is a schematic diagram of a back side structure of the rotating mechanism 23 shown in FIG. 9. The sliding member 2384 is slidably connected inside the first sliding slot 2381 and the second sliding slot 2382. The structure is simple and has a relatively small thickness, which is conducive to the thin design of the electronic device 100.

In the foregoing embodiment, two ends of the first sliding slot 2381 are a first end A1 and a second end A2 respectively, and the first sliding slot 2381 extends from the first end A1 to the second end A2 in a direction close to the base 231. Two ends of the second sliding slot 2382 are a third end B1 and a fourth end B2 respectively, and the second sliding slot 2382 extends from the third end B1 to the fourth end B2 in a direction close to the base 231.

Extension paths of the first sliding slot 2381 and the second sliding slot 2382 may be straight lines, or may be curves. This is not specifically limited herein. In some embodiments, referring to FIG. 15, the first sliding slot 2381 and the second sliding slot 2382 are arc-shaped sliding slots. That is, the extension paths of the first sliding slot 2381 and the second sliding slot 2382 are arcs. The first sliding slot 2381 and the second sliding slot 2382 are arched in a direction away from the lamination surface M3 of the first door panel 232. In this way, driving stability is higher, and motion stability is higher.

Figure 16:
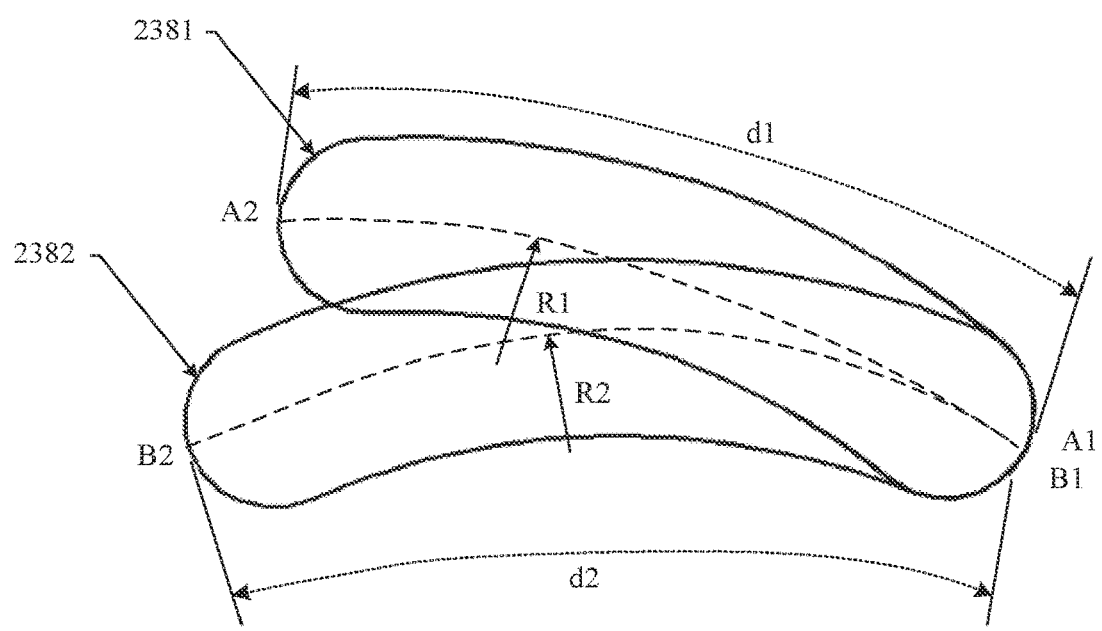
FIG. 16 is a diagram of a relative position between a first sliding slot and a second sliding slot in the rotating mechanism shown in FIG. 15.

In some embodiments, FIG. 16 is a diagram of a relative position between a first sliding slot 2381 and a second sliding slot 2382 in the rotating mechanism shown in FIG. 15. The first sliding slot 2381 has a length of d1 along an extension path thereof, and the second sliding slot 2382 has a length of d2 along an extension path thereof. d1 and d2 each are in a range of [4.5 mm, 5.5 mm].

In some embodiments, still referring to FIG. 16, the first sliding slot 2381 has a curvature radius of R1 at each position along the extension path thereof, the second sliding slot 2382 has a curvature radius of R2 at each position along the extension path thereof, and R1 and R2 each are in a range of [4 mm, 5.5 mm].

In some embodiments, referring to FIG. 10 again, the rotating mechanism 23 further includes a second control assembly 239, where the second control assembly 239 is configured to control the second door panel 233. Specifically, the second control assembly 239 may have a same structural form and control manner over the second door panel 233 as the structural form of the first control assembly 238 and the control manner thereof over the first door panel 232. Details are not described herein again.

In some embodiments, referring to FIG. 10, a part at which the first door panel 232 is hinged to the base 231, a part at which the first main swing arm 236 is hinged to the base 231, and a part at which the auxiliary swing arm 2383 is hinged to the base 231 are staggered in a direction of a rotation axis (that is, the Y-axis direction) of the rotating mechanism 23. In this way, a thickness of the base 231 may be reduced to implement the thin design of the electronic device 100 in an unfolded state.

In some embodiments, still referring to FIG. 10, a part at which the first door panel 232 is hinged to the first connector 234 and a part at which the first main swing arm 236 is hinged to the first connector 234 are staggered in the direction of the rotation axis (that is, the Y-axis direction) of the rotating mechanism 23. In this way, a thickness of the first connector 234 may be reduced to implement the thin design of the electronic device 100 in the unfolded state.

Symmetrical arrangement or staggering in the Y-axis direction may be performed between the second door panel 233 and the first door panel 232, between the second connector 235 and the first connector 234, between the second main swing arm 237 and the first main swing arm 236, and between the first control assembly 238 and the second control assembly 239. FIG. 9 and FIG. 10 give only examples of symmetrical arrangement. In this case, the rotating mechanism 23 has a less complex structure and is more beautiful. The width of the base 231 in the X-axis direction may be further reduced when staggering is performed.

Because the support apparatus 20 according to the embodiments of this application includes the rotating mechanism 23 according to any one of the foregoing technical solutions, the support apparatus and the rotating mechanism can resolve a same technical problem and achieve a same effect.

Because the electronic device 100 according to the embodiments of this application includes the support apparatus 20 according to any one of the foregoing embodiments, the electronic device and the support apparatus can resolve a same technical problem and achieve a same effect.

In description of this specification, specific features, structures, materials or characteristics described may be combined in any one or more embodiments or examples in a suitable manner.

Finally, it should be noted that the foregoing embodiments are only used to illustrate the technical solutions of this application, but are not used to limit this application. Although this application has been described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the spirit and scope of the technical solutions of the embodiments of this application.

What is claimed is:

1. A rotating mechanism, comprising:
    a base;
    a first door panel;
    a first connector; and
    a first main swing arm;
    wherein the first door panel is hinged to the base, the first connector is hinged to the first door panel, and the first connector is configured to be fixed to a first housing;
    wherein each of the first door panel, the first housing, and a second housing has a lamination surface, and the lamination surface is used for lamination to a foldable screen;
    wherein the first main swing arm is located on a side of the first door panel away from the lamination surface of the first door panel, one end of the first main swing arm is hinged to the base, and the other end of the first main swing arm is hinged to the first connector;
    wherein the rotating mechanism is rotatable between an unfolded state and a folded state; and
    wherein:
        based on the rotating mechanism is being in the unfolded state, the lamination surface of the first door panel and the lamination surface of the first housing are coplanarly disposed and face a same direction;
        based on the rotating mechanism is being in the folded state, the lamination surface of the first housing faces the lamination surface of the second housing; and
        based on the rotating mechanism rotating between the unfolded state and the folded state, a rotation angle of the first main swing arm relative to the base is smaller than a rotation angle of the first door panel relative to the base.

2. The rotating mechanism according to claim 1, wherein based on the rotating mechanism is being in the folded state, an included angle between the lamination surface of the first housing and the lamination surface of the first door panel on a side for lamination to the foldable screen is greater than 180°, and an inclination angle of the lamination surface of the first door panel on the side for lamination to the foldable screen relative to the base is less than 90°.

3. The rotating mechanism according to claim 1,
    wherein the first door panel comprises a door panel body and a slide rail, wherein an end of the slide rail is hinged to the base, the door panel body is slidably connected to the slide rail, the first connector is hinged to the door panel body, and the lamination surface of the first door panel is located on the door panel body; and
    wherein the rotating mechanism further comprises a first control assembly;
    wherein the first control assembly is configured to control the door panel body to slide away from the base along the slide rail based on the rotating mechanism rotating from the unfolded state to the folded state; and
    wherein the first control assembly is further configured to control the door panel body to slide along the slide rail close to the base based on the rotating mechanism rotating from the folded state to the unfolded state.

4. The rotating mechanism according to claim 3, wherein;
the first control assembly comprises an auxiliary swing arm;
the first connector is provided with a first sliding slot, and the first main swing arm is provided with a second sliding slot; and
one end of the auxiliary swing arm is hinged to the base, the other end of the auxiliary swing arm is provided with a sliding member, and the sliding member is slidably connected inside the first sliding slot and the second sliding slot.

5. The rotating mechanism according to claim 4, wherein:
two ends of the first sliding slot are a first end and a second end, respectively, and the first sliding slot extends from the first end to the second end in a direction close to the base; and
two ends of the second sliding slot are a third end and a fourth end, respectively, and the second sliding slot extends from the third end to the fourth end in a direction close to the base.

6. The rotating mechanism according to claim 5, wherein the first sliding slot and the second sliding slot are arc-shaped sliding slots, and each of the first sliding slot and the second sliding slot is arched in a direction away from the lamination surface of the first door panel.

7. The rotating mechanism according to claim 6, wherein each of the first sliding slot and the second sliding slot has a length range of [4.5 mm, 5.5 mm] along an extension path thereof.

8. The rotating mechanism according to claim 6, wherein each of the first sliding slot and the second sliding slot has a curvature radius range of [4.5 mm, 5.5 mm] at each position on the extension path thereof.

9. The rotating mechanism according to claim 4, wherein a part at which the first door panel is hinged to the base, a part at which the first main swing arm is hinged to the base, and a part at which the auxiliary swing arm is hinged to the base are staggered in a direction of a rotation axis of the rotating mechanism.

10. The rotating mechanism according to claim 1, wherein a part at which the first door panel is hinged to the first connector and a part at which the first main swing arm is hinged to the first connector are staggered in the direction of the rotation axis of the rotating mechanism.

11. The rotating mechanism according to claim 1,
wherein the first connector is provided with a first hinge slot, and an inner wall of the first hinge slot is provided with a first arc-shaped rib;
wherein the first door panel is provided with a first hinge block, and the first hinge block is provided with a first arc-shaped elongated slot; and
wherein the first hinge block is matched and accommodated in the first hinge slot, and the first arc-shaped rib is matched and accommodated in the first arc-shaped elongated slot.

12. The rotating mechanism according to claim 1,
wherein the base is provided with a second hinge slot, and an inner wall of the second hinge slot is provided with a second arc-shaped rib;
wherein the first main swing arm is provided with a second hinge block, and the second hinge block is provided with a second arc-shaped elongated slot; and
wherein the second hinge block is matched and accommodated in the second hinge slot, and the second arc-shaped rib is matched and accommodated in the second arc-shaped elongated slot.

13. The rotating mechanism according to claim 1,
wherein the first connector is provided with a third hinge slot, and an inner wall of the third hinge slot is provided with a third arc-shaped rib;
wherein the first main swing arm is provided with a third hinge block, and the third hinge block is provided with a third arc-shaped elongated slot; and
wherein the third hinge block is matched and accommodated in the third hinge slot, and the third arc-shaped rib is matched and accommodated in the third arc-shaped elongated slot.

14. The rotating mechanism according to claim 1,
wherein a third door panel is fixed to the first main swing arm, the third door panel has a lamination surface, the lamination surface is used for lamination to the foldable screen, and the base is provided with an avoidance slot;
based on the rotating mechanism being in the unfolded state, the lamination surface of the third door panel, the lamination surface of the first door panel, and the lamination surface of the first housing are coplanarly disposed and face a same direction; and
based on the rotating mechanism is being in the folded state, the third door panel rotates into the avoidance slot.

15. The rotating mechanism according to 14 claim 1, further comprising a second door panel, a second connector, and a second main swing arm;
wherein the second door panel is hinged to the base, the second connector is hinged to the second door panel, and the second connector is configured to be fixed to the second housing;
wherein each of the second door panel and the second housing has a lamination surface, and the lamination surface is used for lamination to the foldable screen;
wherein the second main swing arm is located on a side of the second door panel away from the lamination surface of the second door panel, one end of the second main swing arm is hinged to the base, and the other end of the second main swing arm is hinged to the second connector;
based on the rotating mechanism is being in the unfolded state, the lamination surface of the second door panel and the lamination surface of the first housing are coplanarly disposed with the lamination surface of the first housing and the lamination surface of the first door panel and face a same direction; and
based on the rotating mechanism between the unfolded state and the folded state, a rotation angle of the second main swing arm relative to the base is smaller than a rotation angle of the second door panel relative to the base.

16. A support apparatus, comprising:
a first housing;
a second housing; and
a rotating mechanism comprising a base, a first door panel, a first connector, and a first main swing arm;
wherein the first door panel is hinged to the base, the first connector is hinged to the first door panel, and the first connector is configured to be fixed to the first housing;
wherein each of the first door panel, the first housing, and the second housing has a lamination surface, and the lamination surface is used for lamination to a foldable screen;
wherein the first main swing arm is located on a side of the first door panel away from the lamination surface of the first door panel, one end of the first main swing arm is hinged to the base, and the other end of the first main swing arm is hinged to the first connector;
wherein the rotating mechanism is rotatable between an unfolded state and a folded state;
wherein:
- based on the rotating mechanism being in the unfolded state, the lamination surface of the first door panel and the lamination surface of the first housing are coplanarly disposed and face a same direction;
- based on the rotating mechanism being in the folded state, the lamination surface of the first housing faces the lamination surface of the second housing; and
- based on the rotating mechanism rotating between the unfolded state and the folded state, a rotation angle of the first main swing arm relative to the base is smaller than a rotation angle of the first door panel relative to the base; and wherein the rotating mechanism is located between the first housing and the second housing, the first connector of the rotating mechanism is fixed to the first housing, and the base of the rotating mechanism is connected to the second housing.

17. An electronic device, comprising:
a foldable screen; and
a support apparatus comprising a first housing, a second housing, and a rotating mechanism;
wherein the rotating mechanism comprises a base, a first door panel, a first connector, and a first main swing arm;
wherein the first door panel is hinged to the base, the first connector is hinged to the first door panel, and the first connector is configured to be fixed to the first housing;
wherein each of the first door panel, the first housing, and the second housing has a lamination surface, and the lamination surface is used for lamination to a foldable screen;
wherein the first main swing arm is located on a side of the first door panel away from the lamination surface of the first door panel, one end of the first main swing arm is hinged to the base, and the other end of the first main swing arm is hinged to the first connector;
wherein the rotating mechanism is rotatable between an unfolded state and a folded state;
wherein:
- based on the rotating mechanism being in the unfolded state, the lamination surface of the first door panel and the lamination surface of the first housing are coplanarly disposed and face a same direction;
- based on the rotating mechanism being in the folded state, the lamination surface of the first housing faces the lamination surface of the second housing; and
- based on the rotating mechanism rotating between the unfolded state and the folded state, a rotation angle of the first main swing arm relative to the base is smaller than a rotation angle of the first door panel relative to the base; and wherein the foldable screen comprises a first part, a second part, and a bent part, the bent part is located between the first part and the second part, the first part is supported and fixed to the first housing, the second part is supported and fixed to the second housing, and the bent part is supported on the rotating mechanism of the support apparatus.

* * * * *

UNITED STATES PATENT AND TRADEMARK OFFICE
CERTIFICATE OF CORRECTION

Page 1 of 1

PATENT NO. : 12,164,345 B2
APPLICATION NO. : 17/923726
DATED : December 10, 2024
INVENTOR(S) : Zhang et al.

It is certified that error appears in the above-identified patent and that said Letters Patent is hereby corrected as shown below:

In the Claims

Claim 1, Column 16, Line 25: "swing arm is hinged to the first connector; and" should read -- swing arm is hinged to the first connector; --.

Claim 1, Column 16, Line 29: "based on the rotating mechanism is being in the" should read -- based on the rotating mechanism being in the --.

Claim 1, Column 16, Line 34: "based on the rotating mechanism is being in the folded" should read -- based on the rotating mechanism being in the folded --.

Claim 2, Column 16, Line 43: "based on the rotating mechanism is being in the folded state," should read -- based on the rotating mechanism being in the folded state, --.

Claim 3, Column 16, Line 57: "and" should be deleted.

Claim 4, Column 17, Line 1: "The rotating mechanism according to claim 3, wherein;" should read -- The rotating mechanism according to claim 3, wherein: --.

Claim 14, Column 18, Line 23: "based on the rotating mechanism is being in the folded" should read -- based on the rotating mechanism being in the folded --.

Claim 15, Column 18, Line 25: "15. The rotating mechanism according to 14 claim 1," should read -- 15. The rotating mechanism according to claim 1, --.

Claim 15, Column 18, Line 42: "based on the rotating mechanism is being in the unfolded" should read -- based on the rotating mechanism being in the unfolded --.

Signed and Sealed this
Twenty-first Day of January, 2025

Coke Morgan Stewart
*Acting Director of the United States Patent and Trademark Office*